J. T. COWLEY.
PNEUMATIC DESPATCH TUBE APPARATUS.
APPLICATION FILED MAY 11, 1908.
978,271.
Patented Dec. 13, 1910.
2 SHEETS—SHEET 2.
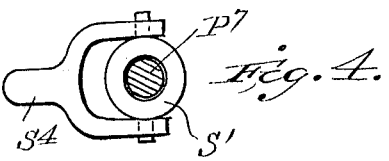
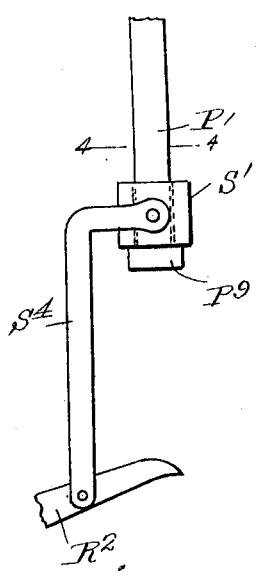
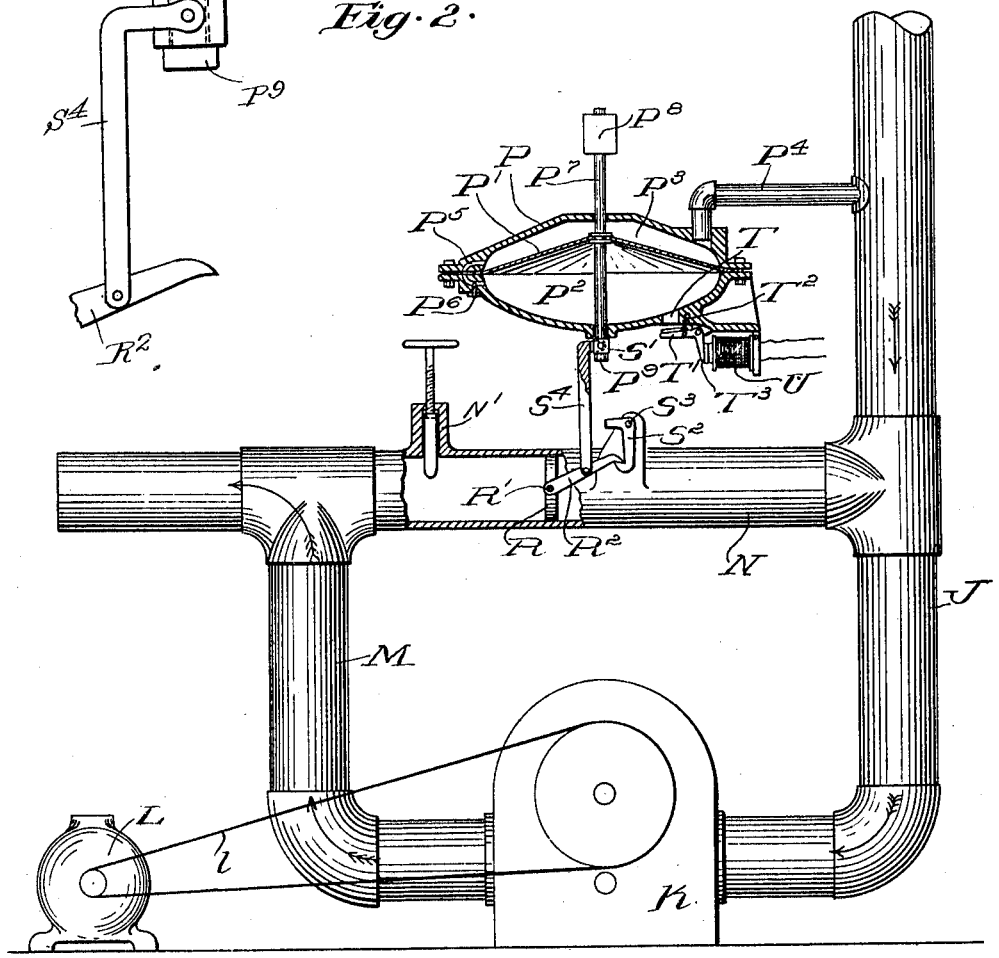

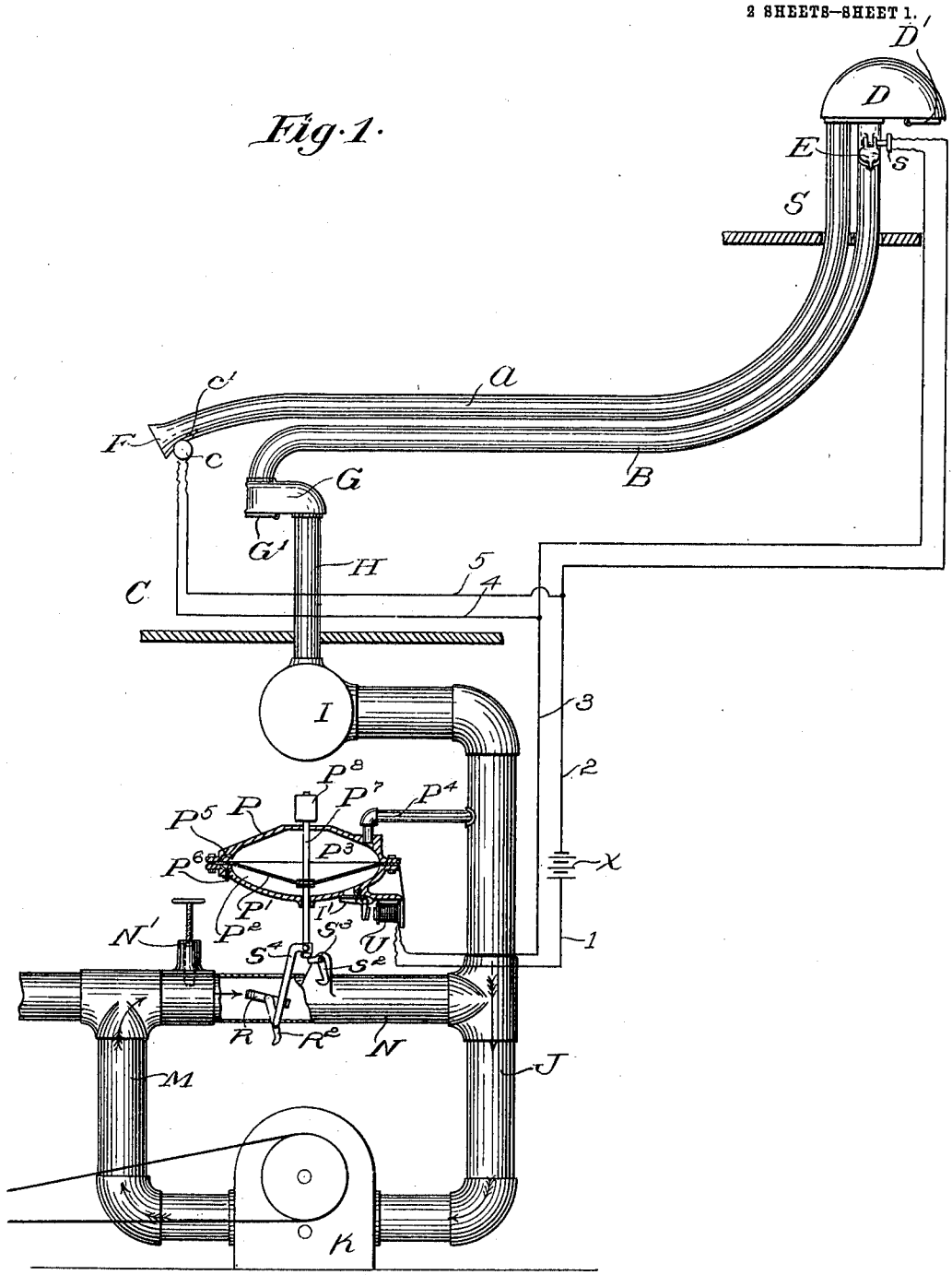

UNITED STATES PATENT OFFICE.

JAMES T. COWLEY, OF BOSTON, MASSACHUSETTS, ASSIGNOR TO LAMSON CONSOLIDATED STORE SERVICE COMPANY, OF NEWARK, NEW JERSEY, A CORPORATION OF NEW JERSEY.

PNEUMATIC-DESPATCH-TUBE APPARATUS.

978,271. Specification of Letters Patent. Patented Dec. 13, 1910.

Application filed May 11, 1908. Serial No. 432,154.

To all whom it may concern:

Be it known that I, JAMES T. COWLEY, of Boston, in the county of Suffolk and State of Massachusetts, have invented certain new and useful Improvements in Pneumatic-Despatch-Tube Apparatus, of which the following is a specification.

My invention relates to improvements in pneumatic despatch tube apparatus and its object is to provide means for controlling the current of air generated by the blower or pump connected with the transmission tubes, to switch said air current through said transmission tubes for the purpose of despatching and transmitting carriers and to normally maintain said air current short circuited when no carriers are in transit thereby relieving the load upon the blower and effecting a consequent saving of power.

In the accompanying drawings is illustrated a construction embodying my invention, in which,—

Figure 1 is a diagrammatic view of the apparatus showing the mechanism in normal position with the air current short circuited and the blower operating unloaded. Fig. 2 is an enlarged elevation partly in section of a portion of Fig. 1 showing the position of the parts with the blower loaded and the air current diverted through the transmission tubes for driving carriers. Fig. 3 is an enlarged detail view of the valve controlling mechanism. Fig. 4 is a sectional view on the line 4—4 of Fig. 3.

Like letters of reference refer to like parts throughout the several views.

A represents a transmission tube connecting the central station C with the terminal D controlled by the ordinary delivery valve D' at the sub-station S.

B is a return transmission tube and connects the terminal D at the sub-station S with the terminal G controlled by the valve G' at central station C.

F represents a bellmouth or air inlet for despatching carriers in the tube A and E is the ordinary despatching inlet for inserting carriers into the tube B.

I is the ordinary drum to which the terminal G is connected by tube H and J is a conduit connecting the drum I with the vacuum connection of a blower K which is driven by a constant speed electric motor L through a belt $l$. The pipe M connects the blower K with the atmosphere and the pipe N connects said pipe M with the conduit J normally permitting a continuous circulation of air from one side of the blower to the other. An adjustable valve N' controlling the pipe N is adapted to be adjusted to furnish sufficient resistance to the flow of air through said pipe N to normally maintain a slight vacuum in the conduit J sufficient to operate the controlling mechanism to be hereinafter described.

A diaphragm casing P having mounted therein the diaphragm P' is connected above said diaphragm by means of a pipe $P^4$ while the chamber $P^2$ beneath said diaphragm is connected with the chamber $P^3$ above through a bypass $P^5$ controlled by an adjustable timing valve $P^6$. The stem $P^7$ secured to the diaphragm P' carries on its upper end a weight $P^8$ and on its lower end a collar $P^9$.

R is a butterfly valve pivoted at R' in the pipe N and adapted to be operated by an arm $R^2$ to control the passage of air through said pipe. The link $S^4$ is pivoted at one end to said arm $R^2$ and carries pivoted in its opposite bifurcated end a sleeve S' which is movable on the lower end of the stem $P^7$. A latch $S^2$ pivoted at $S^3$ is adapted to engage and retain the arm $R^2$ at a certain position of the valve R.

A port T is adapted to admit air to the chamber $P^2$ and is controlled by a normally closed valve T' actuated by a spring $T^2$ to hold said valve closed and by an armature $T^3$ adapted to be operated by a magnet U to open said valve. Magnet U is in circuit with a battery X and a normally open switch $s$ adapted to be operated by the inlet E at sub-station S through wires 1, 2 and 3. At the bellmouth F is a normally open switch $c$ operated by a trip $c'$ and which switch is connected in multiple through wires 4 and 5.

The operation of the apparatus is as follows.—In despatching a carrier from the central station C to the sub-station S the operator inserts the carrier into the bellmouth F where it engages the trip $c'$ closing the switch $c$ and energizing magnet U. The armature $T^3$ is now attracted to the magnet U against the tension of spring $T^2$ opening the valve T' admitting atmospheric pressure through port T destroying the vacuum in chamber $P^2$. The vacuum in the chamber $P^3$ above the diaphragm P' permits the atmospheric pressure below to raise said diaphragm P' against the action of weight P⁸ from the position shown in Fig. 1 to that shown in Fig. 2. This action of diaphragm P' acts through stem P⁷, link S⁴ and arm R² to close valve R cutting off the flow of air through pipe N. The air is now taken through bellmouth F, tubes A, B, H, conduit J, through blower K and exhausted into the atmosphere through pipe M in the direction indicated by the arrows as shown in Fig. 2 and driving the carrier through the tube A toward the sub-station S. In the meantime the carrier having passed the trip c' releases the switch c deënergizing magnet U, releasing armature T³ permitting the valve T to be closed by means of spring T² thereby cutting off the admission of air to chamber P². The air in said chamber P² is now gradually exhausted through bypass P⁵ restricted by timing valve P⁶ so that by the time the carrier has delivered at sub-station S the diaphragm P' has dropped, assisted by weight P⁸, to the position shown in Fig. 1 when the collar P⁹ trips latch S² releasing the arm R² allowing the valve R to open by the weight of said arm R² and link S⁴, short circuiting the flow of air through pipe N and relieving the load upon the blower K. In despatching a carrier from the sub-station S to the central station C the operator opens the inlet E inserts the carrier into the tube B and closes the said inlet. The opening of the inlet closes the switch s and energizes the magnet U while the operation of the parts will be identical with that heretofore described, that is, the flow of air will be switched through the transmission tubes driving the carrier to the central station C when the flow of air will be automatically short circuited unloading the blower.

Having thus described my invention and set forth a construction embodying the same, what I claim as new and desire to secure by Letters Patent of the United States is,—

1. In a pneumatic despatch tube apparatus, a tube for the transmission of carriers, a constantly operating blower or pump, a vacuum connection between said tube and said blower or pump, a conduit normally communicating with the atmosphere and connecting the outlet of said blower or pump with said vacuum connection, a normally open valve controlling said conduit, and means adapted to be operated to close said valve to create a flow of air through said transmission tube and said blower or pump for driving carriers.

2. In a pneumatic despatch tube apparatus, a tube for the transmission of carriers, a constantly operating blower or pump, a vacuum connection between said tube and said blower or pump, a conduit normally communicating with the atmosphere and connecting the outlet of said blower or pump with said vacuum connection, a normally open valve controlling said conduit, means adapted to be operated to close said valve to create a flow of air through said transmission tube and said blower or pump for driving carriers, and means for retaining said valve closed to maintain the flow of air through said transmission tube only during the interval necessary for the transmission and delivery of said carriers.

3. In a pneumatic despatch tube apparatus, a tube for the transmission of carriers, a constantly operating blower or pump, a vacuum connection between said tube and said blower or pump provided with an air inlet, a normally open valve controlling said inlet, means for regulating the volume of air normally entering said inlet to maintain a normal pre-determined vacuum in said connection, means under the control of said vacuum adapted to be operated to close said valve to create a flow of air through said transmission tube for driving carriers, and means for retaining said valve closed during the interval of transmission of said carriers.

4. In a pneumatic despatch tube apparatus, a tube for the transmission of carriers, a constantly operating blower or pump, a vacuum connection between said tube and said blower or pump provided with an air inlet, a normally open valve controlling said inlet, means for regulating the volume of air normally entering said inlet to maintain a normal predetermined vacuum in said connection, means under the control of said vacuum adapted to be operated to close said valve to create a flow of air through said transmission tube for driving carriers, means for retaining said valve closed during the interval of transmission of said carriers, and means for releasing and opening said valve when said carriers have delivered.

In testimony whereof, I have signed my name to this specification in the presence of two subscribing witnesses, this seventh day of May A. D. 1908.

JAMES T. COWLEY.

Witnesses:
   L. G. BARTLETT,
   A. L. MESSER.